(12) United States Patent
Hill (10) Patent No.: US 7,455,818 B2
(45) Date of Patent: Nov. 25, 2008

(54) METHOD FOR TREATING A FLOW OF GAS AND GAS TREATMENT SYSTEM

(75) Inventor: Axel Hill, Stockstadt (DE)

(73) Assignee: Areva NP GmbH, Erlangen (DE)

( * ) Notice: Subject to any disclaimer, the term of this patent is extended or adjusted under 35 U.S.C. 154(b) by 627 days.

(21) Appl. No.: 11/098,348

(22) Filed: Apr. 4, 2005

(65) Prior Publication Data

US 2005/0220689 A1     Oct. 6, 2005

Related U.S. Application Data

(63) Continuation of application No. PCT/EP03/10103, filed on Sep. 11, 2003.

(30) Foreign Application Priority Data

Oct. 2, 2002    (DE)  .................................. 102 46 252

(51) Int. Cl.
| | |
|---|---|
| B01D 53/02 | (2006.01) |
| B01D 53/34 | (2006.01) |
| B01J 12/00 | (2006.01) |
| B01J 19/00 | (2006.01) |
| G21C 3/56 | (2006.01) |
| G21C 15/00 | (2006.01) |

(52) U.S. Cl. ........................ 423/210; 423/248; 423/246; 423/247; 423/220; 423/245.1; 423/245.3; 423/219; 422/105; 422/108; 422/111; 422/168; 422/169; 422/170; 422/171; 422/172; 422/177; 422/180; 422/181; 376/361; 376/383; 376/385; 376/395

(58) Field of Classification Search ................. 423/210, 423/248, 246, 247, 220, 245.1, 245.3, 219; 422/105, 108, 111, 168, 169, 170, 171, 172, 422/177, 180, 181; 376/361, 383, 385, 395
See application file for complete search history.

(56) References Cited

U.S. PATENT DOCUMENTS 3,993,540 A    11/1976   Longton et al.

(Continued)

FOREIGN PATENT DOCUMENTS

DE       25 03 137 A1    8/1975

(Continued)

OTHER PUBLICATIONS

Japanese Office dated Jul. 17, 2008.

*Primary Examiner*—Timothy C Vanoy
(74) *Attorney, Agent, or Firm*—Laurence A. Greenberg; Werner H. Stemer; Ralph E. Locher (57) ABSTRACT

A method treats a flow gas that is guided via a catalytic adsorber module to oxidize contaminants carried in the flow gas. The method reliably purifies the flow gas using equipment that is held to a comparatively low level of complexity. To this end, the flow gas is guided in a first purification step via a first catalytic adsorber module to oxidize contaminants carried along therewith, during which molecular or atomic oxygen is added to the flow gas, and the flow gas mixed with the added oxygen is guided in a second purification step via an oxidation catalyst. The flow gas flowing away from the oxidation catalyst is guided in a third purification step via a second catalytic adsorber module to reduce excessive oxygen.

19 Claims, 3 Drawing Sheets

U.S. PATENT DOCUMENTS

| | | | |
|---|---|---|---|
| 4,167,444 A | 9/1979 | Schweiger | |
| 4,869,883 A | 9/1989 | Thorogood et al. | |
| 6,054,108 A * | 4/2000 | Eckardt et al. | 423/580.1 |
| 6,356,613 B1 * | 3/2002 | Eckardt et al. | 376/301 |
| 6,942,846 B1 * | 9/2005 | Eckardt et al. | 423/437.2 |
| 2003/0044338 A1 | 3/2003 | Giacobbe et al. | |

FOREIGN PATENT DOCUMENTS

| | | |
|---|---|---|
| DE | 25 52 138 A1 | 5/1976 |
| DE | 2552138 A1 | 5/1976 |
| DE | 26 01 460 A1 | 7/1977 |
| EP | 0 350 656 A2 | 1/1990 |
| EP | 0 792 680 A1 | 9/1997 |
| GB | 1102764 | 2/1968 |
| GB | 1 306 240 | 2/1973 |
| GB | 1 470 795 | 4/1977 |
| JP | 51059200 A | 5/1976 |

\* cited by examiner

METHOD FOR TREATING A FLOW OF GAS AND GAS TREATMENT SYSTEM

CROSS-REFERENCE TO RELATED APPLICATION

This is a continuing application, under 35 U.S.C. § 120, of copending international application No. PCT/EP2003/010103, filed Sep. 11, 2003, which designated the United States; this application also claims the priority, under 35 U.S.C. § 119, of German patent application No. 102 46 252.6, filed Oct. 2, 2002; the prior applications are herewith incorporated by reference in their entirety.

BACKGROUND OF THE INVENTION

1. Field of the Invention

The invention relates to a process for the treatment of a gas stream, in which the gas stream is passed over a catalytic adsorber module to oxidize entrained impurities. It further relates to a gas treatment system suitable for carrying out the process.

2. Summary of the Invention

It is accordingly an object of the invention to provide a method for treating a flow of gas and a gas treatment system that overcome the above-mentioned disadvantages of the prior art devices and methods of this general type.

In the operation of a nuclear plant, in particular a nuclear power station, a customary design objective is the best possible avoidance of corrosion damage on important components, especially in the primary region of the respective plant, for example on graphite internals, fuel assemblies or other components in the pressure vessel of the reactor. This is because substantial avoidance of corrosion damage on these components should increase the life or operating time and keep down the maintenance and repair requirement associated with the alleviation of corrosion damage in the primary region of the nuclear plant, which is sometimes considerable. For this reason, the use of helium may be specified as a working or cooling medium in a nuclear plant, in particular in the primary circuit of a high-temperature reactor. This is because helium is chemically inert, so that, for example, corrosion phenomena caused by the cooling gas on the components specified does not have to be reckoned with when helium is used as the cooling gas for these components.

However, impurities such as carbon monoxide (CO), molecular hydrogen ($H_2$), methane ($CH_4$), molecular oxygen ($O_2$), tritium, water ($H_2O$), carbon dioxide ($CO_2$) and/or dust particles can get into the helium used as the primary coolant or cooling gas during operation of the nuclear plant, in particular during operation of a high-temperature reactor. The impurities can in turn lead to undesirable corrosion phenomena on the components specified. To keep these effects small and, in particular, below prescribed limits which are considered to be still permissible, limitation of the concentration of such impurities in the cooling gas stream by use of a gas purification plant or a gas treatment system may be specified.

During operation of such a gas purification system, a substream of from about 50 kg/h to 300 kg/h is usually taken from the helium cooling circuit and first passed through a dust filter. The gas stream to be purified is subsequently heated to a temperature of about 250° C. and fed to a catalytic adsorber module. The catalytic adsorber module serves first to catalyze the transformation processes provided and second as a type of buffer for the temporary storage of oxygen required in these processes. In the catalytic adsorber module, which usually contains a Cu—CuO mixture as catalytically active adsorber component, oxidation of the hydrogen and carbon monoxide entrained as impurities in the gas stream to be purified to water ($H_2O$) and carbon dioxide ($CO_2$) occurs under the specified, suitably selected operating temperature. The oxygen required for this is taken from the CuO of the catalytically active adsorber material, so that a continuous increase in the proportion of Cu at the expense of the CuO occurs as a result of the reaction. The gas stream to be purified, which has now been freed of molecular hydrogen and carbon monoxide, is then usually cooled, with the entrained water and carbon dioxide being separated out in molecular sieves. A low-temperature adsorption in which predominantly methane, molecular oxygen and association products are removed by adsorption from the gas stream to be purified is then usually carried out. After the removal of the impurities is complete, the now purified gas stream is returned to the helium cooling circuit.

However, such a gas treatment system is comparatively complicated, especially in respect of the number and installation of the components required. In addition, the use of the catalytic adsorber module of the type mentioned results in that regeneration by treatment with oxygen is necessary after the CuO in the catalytic adsorber module has been "consumed", i.e. after virtually all the CuO has been converted into Cu, so that the respective module is not available for purification of the gas stream during this time. For this reason, two or more similar sub-lines are usually connected in parallel in such a gas treatment system, which increases the outlay for apparatus even further.

It is therefore an object of the invention to provide a process for the treatment of a gas stream of the above-mentioned type by which reliable purification of the gas stream is made possible using comparatively simple apparatus. Furthermore, a gas treatment system, which is particularly suitable for carrying out the process is to be provided.

According to the invention, this object is achieved in respect of the process by passing the gas stream over a first catalytic adsorber module in a first purification stage for the oxidation of entrained impurities and mixing molecular or atomic oxygen into the gas stream, with the gas stream which has been admixed with the mixed-in oxygen being passed over an oxidation catalyst in a second purification stage and the gas stream leaving the oxidation catalyst being passed over a second catalytic adsorber module in a third purification stage for the reduction of excess oxygen.

The invention starts out from the idea that the outlay in terms of apparatus and operation for reliable purification of the gas stream using catalytic adsorber modules can be kept particularly low by, in particular, keeping the total number of components required small. The concept of gas treatment should therefore be directed at substantial avoidance of redundancies in the components used. To accordingly keep the number of sub-lines having the same effect which are connected in parallel particularly small or to be able to configure the gas treatment system as a single line in terms of the gas flow, the concept for the treatment of the gas stream should be directed at continuous operation of the respective catalytic adsorber module. This can be achieved by the use of two catalytic adsorber modules connected in series in the direction of gas flow, of which one is used in a conventional manner for the oxidation of the entrained impurities in the treatment of the gas stream and is reduced as a result, while the other catalytic adsorber module is used for the reduction of oxygen and is oxidized as a result.

When one of the adsorber modules is completely "exhausted", i.e. the respective constituent is completely oxidized or reduced, in such a configuration, continued operation of the gas treatment system is made possible by simple reversal of the gas flow through the catalytic adsorber modules. To make the combined use of the catalytic adsorber modules for oxidation and reduction, respectively, possible, the gas stream is subjected to a further purification stage, which is required in any case, in an oxidation catalyst between the catalytic adsorber modules. The additional oxygen required for this purpose is mixed into the gas stream at a suitable point upstream of the oxidation catalyst, with excess oxygen being available in the second, downstream catalytic adsorber module for oxidation and thus regeneration of the latter.

A Cu—CuO mixture is advantageously used as the catalytic adsorber material both in the first catalytic adsorber module and in the second catalytic adsorber module. In the first catalytic adsorber module viewed in the direction of gas flow, which is provided for oxidation of impurities entrained in the gas stream, the CuO in the adsorber material is converted into Cu with liberation of the oxygen required for oxidation. In contrast, in the second catalytic adsorber module viewed in the direction of gas flow, in which the excess oxygen now present in the gas stream is removed by adsorption, the Cu in the catalytic adsorber material is converted into CuO. As the time of operation of the treatment of the gas stream increases, the proportion of Cu in the first, upstream catalytic adsorber module increases and the proportion of CuO in the catalytic adsorber material present there decreases, while, conversely, the proportion of Cu in the second, downstream catalytic adsorber module decreases and the proportion of CuO in the catalytic adsorber material present there increases. If one of the catalytic adsorber modules is found to be "exhausted", i.e. the respective catalytic adsorber material present has been completely converted into Cu or CuO, the gas flow through the catalytic adsorber modules can be switched over, so that the CuO-enriched catalytic adsorber module is now used as first catalytic adsorber module for the oxidation of impurities entrained in the gas stream and the Cu-enriched catalytic adsorber module is used as second catalytic adsorber module for the reduction of excess oxygen.

Oxygen is advantageously mixed in in such an amount that sufficient excess oxygen is always present in the second, downstream catalytic adsorber module to oxidize the catalytically active adsorber material present there. For this purpose, it is advantageous to determine an index for the proportion of entrained impurities in the gas stream before the gas stream enters the first catalytic adsorber module, by which the amount of oxygen to be mixed into the gas stream settles. To ensure efficient utilization of both the first catalytic adsorber module and also the second catalytic adsorber module, the amount of oxygen mixed in is advantageously set so that there is a deficiency of oxygen based on the total impurities entrained in the gas stream and thus at least part of the oxidation of the impurities occurs in the first catalytic adsorber module and so that there is an oxygen excess based on the reaction of further impurities intended to occur in the oxidation catalyst, so that excess oxygen is available in the second catalytic adsorber module for regeneration of the catalytic adsorber material present there.

The oxidation catalyst is preferably used for the treatment of impurities such as methane or tritium. To ensure a particularly high conversion and thus particularly careful removal of such impurities from the gas stream, the temperature of the gas stream is advantageously set to from about 400° C. to 450° C. before it enters the oxidation catalyst, so that, when sufficient oxygen has been made available, particularly substantial conversion of the impurities mentioned into water and carbon dioxide can occur. A particularly resource-conserving and thus economical mode of operation can be achieved in a particularly advantageous embodiment by the gas stream being preheated by recuperative heat exchange with the gas stream leaving the oxidation catalyst before the first gas stream enters the oxidation catalyst. The heat contained in the gas stream leaving the oxidation catalyst is at least partly utilized for preheating the gas stream entering the oxidation catalyst, so that supplementary heating, for example electric supplementary heating, may still be necessary for setting the final desired entry temperature in the gas stream.

Particularly when using a Cu—CuO mixture as the catalytically active adsorber material in the first catalytic adsorber module, this is preferably used for the oxidation of hydrogen and carbon monoxide entrained in the gas stream. To ensure a particularly favorable reaction rate and a particularly favorable degree of reaction in the oxidation of these to water and carbon dioxide with targeted utilization of the catalytic properties of Cu, a temperature of about 250° C. is advantageously set for the gas stream before it enters the first catalytic adsorber module. Here too, a particularly resource-conserving and thus economical mode of operation can be achieved in a further advantageous embodiment by the gas stream being preheated by recuperative heat exchange with the gas stream leaving the second catalytic adsorber module before the first gas stream enters the first catalytic adsorber module. Thus, in this advantageous embodiment, the heat content of the total gas stream leaving the second catalytic adsorber module and thus the gas purification system is utilized for the partial preheating of the gas stream flowing into the gas purification system.

In a particularly advantageous embodiment, the process is used in the operation of a nuclear power plant for the treatment of a substream of a helium cooling gas stream. Here, the substream of the helium cooling gas stream is preferably freed of entrained impurities such as carbon monoxide, molecular hydrogen, methane, molecular oxygen, tritium, water and/or carbon dioxide. The conversion of molecular hydrogen and carbon monoxide into water and carbon dioxide is preferably effected in the first catalytic adsorber element. When a sufficient amount of oxygen is mixed in in good time, methane and/or tritium are then likewise converted into carbon dioxide and/or water in the oxidation catalyst. The excess oxygen, which then still remains in the gas stream is subsequently used for enrichment of the second catalytic adsorber module and thus removed from the gas stream again. Removal of the water and carbon dioxide still present in the gas stream can subsequently be effected in a conventional way, and can, if appropriate, be supplemented by removal of dust particles or noble gas activities. The helium gas substream, which has been purified in this way is subsequently returned to the actual helium cooling circuit.

In this application in particular, the process can be utilized in a particularly advantageous way to make continuous treatment of a gas stream possible while using comparatively few components. Since the first catalytic adsorber module viewed in the flow direction of the gas stream is reduced in the treatment of the gas stream but the second catalytic adsorber module viewed in the flow direction of the gas stream is oxidized, CuO is continuously converted into Cu in the first catalytic adsorber module and Cu is continuously converted into CuO in the second catalytic adsorber module.

As soon as it has been established that one of the catalytic adsorber modules is completely "exhausted", i.e. the Cu or the CuO has been converted completely into the other component of the mixture, the order in which the catalytic adsorber modules are connected in the flow path of the gas stream can be switched around. After switching has been carried out, the second catalytic adsorber module which has hitherto been utilized for removal of oxygen from the gas stream is thus utilized further as newly connected first catalytic adsorber module, with the oxygen incorporated in this adsorber module now being given off again to the gas stream in the treatment of the relevant impurities in the gas stream. The first catalytic adsorber module which has hitherto been used for the oxidation of hydrogen or carbon monoxide in the gas stream is, after switching over, utilized as newly connected second catalytic adsorber module, with the CuO present in the catalytically active adsorber material being regenerated by uptake of the excess oxygen from the gas stream.

To achieve timely and particularly appropriate implementation of the switch-over, an index for the proportion of possibly entrained oxygen is advantageously determined for the gas stream leaving the second catalytic adsorber module. After a prescribed limit for this index has been exceeded, it is concluded that the Cu in the second catalytic adsorber module has been completely reacted, so that the positions of the first and second catalytic adsorber elements in the flow path of the gas stream are exchanged.

With regard to the gas treatment system, the object indicated is achieved by at least two catalytic adsorber modules, which are connected in series in the direction of a gas stream and between which an oxidation catalyst is located.

To aid the intended conversion of the respective impurities in the oxidation catalyst to a particular degree, the oxidation catalyst is advantageously preceded in the gas flow direction by a feed unit for molecular or atomic oxygen (test, see above). In a particularly advantageous embodiment, the introduction or mixing-in of the oxygen into the gas stream is carried out in the amount required and thus as a function of the impurities entrained in the gas stream. To make this possible, a control parameter transducer assigned to the feed unit is advantageously connected on the inlet side to a sensor for the proportion of entrained impurities in the gas stream located upstream of the first, upstream catalytic adsorber module.

The gas treatment system is advantageously equipped for use in the treatment of a substream from a helium primary cooling circuit of a nuclear plant. For the removal of typical impurities such as molecular hydrogen or carbon monoxide from a helium gas stream in particular, first the catalytic properties and second the suitability for storage of oxygen of a Cu—CuO mixture are particularly advantageous. The catalytic adsorber modules of the gas treatment system therefore advantageously each contain a Cu—CuO mixture as catalytic adsorber material.

To make it possible to set particularly advantageous and appropriate operating parameters, in particular a suitable operating temperature in the oxidation catalyst, the oxidation catalyst is advantageously preceded in the gas flow direction by an intermediate heating system. This can be operated in a particularly resource-conserving and thus economical manner when it is configured for the recovery of heat from the gas stream leaving the oxidation catalyst. To achieve this, the intermediate heating system advantageously contains a recuperative heat exchanger, which is connected on the primary side into an outflow line for the gas stream from the oxidation catalyst and on the secondary side into an inflow line for the gas stream to the oxidation catalyst.

To make it possible for a desired entry temperature of the gas stream into the oxidation catalyst to be set appropriately in a flexible mode of operation, the recuperative heat exchanger is supplemented in a further advantageous embodiment by a heating element, advantageously an electric heater. In an analogous manner, the gas treatment system is also configured for the setting of a particularly favorable operating temperature in the first, upstream catalytic adsorber module. For this purpose, it is advantageously preceded by a heating system. The heating system, too, can be operated in a particular resource-conserving and thus economical manner by being advantageously configured for the recovery of heat from the gas stream leaving the gas treatment system. To achieve this, the heating system contains, in a further advantageous embodiment, a recuperative heat exchanger, which is connected on the primary side into an outflow line for the gas stream from the second catalytic adsorber module and on the secondary side into an inflow line for the gas stream into the first catalytic adsorber module.

In a particularly advantageous embodiment, the gas treatment system is configured for a continuous mode of operation in which the first, upstream catalytic adsorber module is reduced during operation and the second, downstream catalytic adsorber module is oxidized. To make continuous operation possible even after complete reaction of the active materials in these reactions, the gas treatment system is advantageously configured for switching of the catalytic adsorber modules in respect of their connection in the flow path of the gas stream when necessary. For this purpose, the catalytic adsorber modules are advantageously provided with a joint switching system for directing the flow of the gas stream.

A particularly compact construction of the gas treatment system can be achieved in a particularly advantageous embodiment by its components, i.e. in particular the catalytic adsorber modules and the oxidation catalyst but also, if applicable, the heating systems with their heat exchangers and/or the feed unit for oxygen, being disposed in an integrated configuration in a common pressure vessel. Here, all components mentioned can be surrounded by a common pressurized enclosure which ensures maintenance of the pressure of the total system.

The individual components located in the high-pressure enclosure can, as a result of the decoupling of the maintenance of the pressure from the structural configuration of the individual components, have comparatively thin walls and be designed for low mechanical stresses. This first allows a material-saving and thus economical construction and second, owing to the then comparatively small thermal masses, comparatively rapid heating and cooling of individual components and rapid and flexible matching of the reaction temperatures required for the gas stream to be purified. In particular, a thin-walled configuration of the active components makes it possible for a comparatively high temperature to be set quickly and reliably in the respective reaction zones, so that a comparatively high conversion in the individual reactions can be achieved even in the short term.

In addition, the integration of the recuperative heat exchanger into the common pressurized enclosure also allows effective cooling of the outflowing gas stream before it reaches downstream purification components, for example molecular sieves, with effective heating of the inflowing gas stream being ensured at the same time. The recuperative heat exchanger located upstream of the oxidation catalyst likewise makes it possible to achieve effective cooling of the gas stream leaving the oxidation catalyst, so that overheating of the second catalytic adsorber module located downstream of this can be reliably avoided.

The gas treatment system is advantageously connected to the helium cooling gas circuit of a nuclear plant.

The advantages achieved by the invention are, in particular, that the connection of an oxidation catalyst in series between a first catalytic adsorber module and a second catalytic adsorber module makes targeted treatment of various impurities in the respective gas stream possible, with the first, upstream catalytic adsorber module being able to be used for oxidation purposes in the treatment of the gas stream and its oxygen-carrying component thus being increasingly consumed but the second, downstream catalytic adsorber module being at the same time able to be used in converse operation to remove excess oxygen from the gas stream, thus regenerating its oxygen-carrying component.

The normal operation of a catalytic adsorber module and the regeneration of a catalytic adsorber module are thus effected at the same time and thus in one process operation. Even after "consumption" of the oxygen-carrying component has occurred in the first, upstream catalytic adsorber module, the gas treatment system can be utilized further without an appreciable interruption to operation after the positions of the catalytic adsorber modules in the flow path of the gas stream have simply been switched over so that the previously regenerated adsorber module is now used as first, upstream catalytic adsorber module for the oxidation of impurities in the gas stream and the "exhausted" catalytic adsorber module is now regenerated at the same time. As a result of the continuous operation of the gas treatment system, in which interruptions to operation for specific regeneration of individual adsorber modules are no longer necessary, made possible in this way, redundancies or multi-stream configurations of such systems can be dispensed with or at least reduced. In addition, the integration of the active components into a common pressurized enclosure achieves a particularly compact and thus space-saving construction in which particularly simple and rapid process operation is additionally made possible as a result of the decoupling of maintenance of the pressure from the thermally stressed structural components.

Other features which are considered as characteristic for the invention are set forth in the appended claims.

Although the invention is illustrated and described herein as embodied in a method for treating a flow of gas and a gas treatment system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a gas treatment system 1. The gas treatment system 1 is provided for the treatment of a gas stream G, namely a substream from a helium primary cooling circuit of a nuclear plant, which is not shown in more detail. For this purpose, the gas treatment system 1 is connected via a gas feed line 2 and a gas discharge line 4 to the helium primary cooling circuit, which is not shown in more detail, of the nuclear plant.

Figure 1:
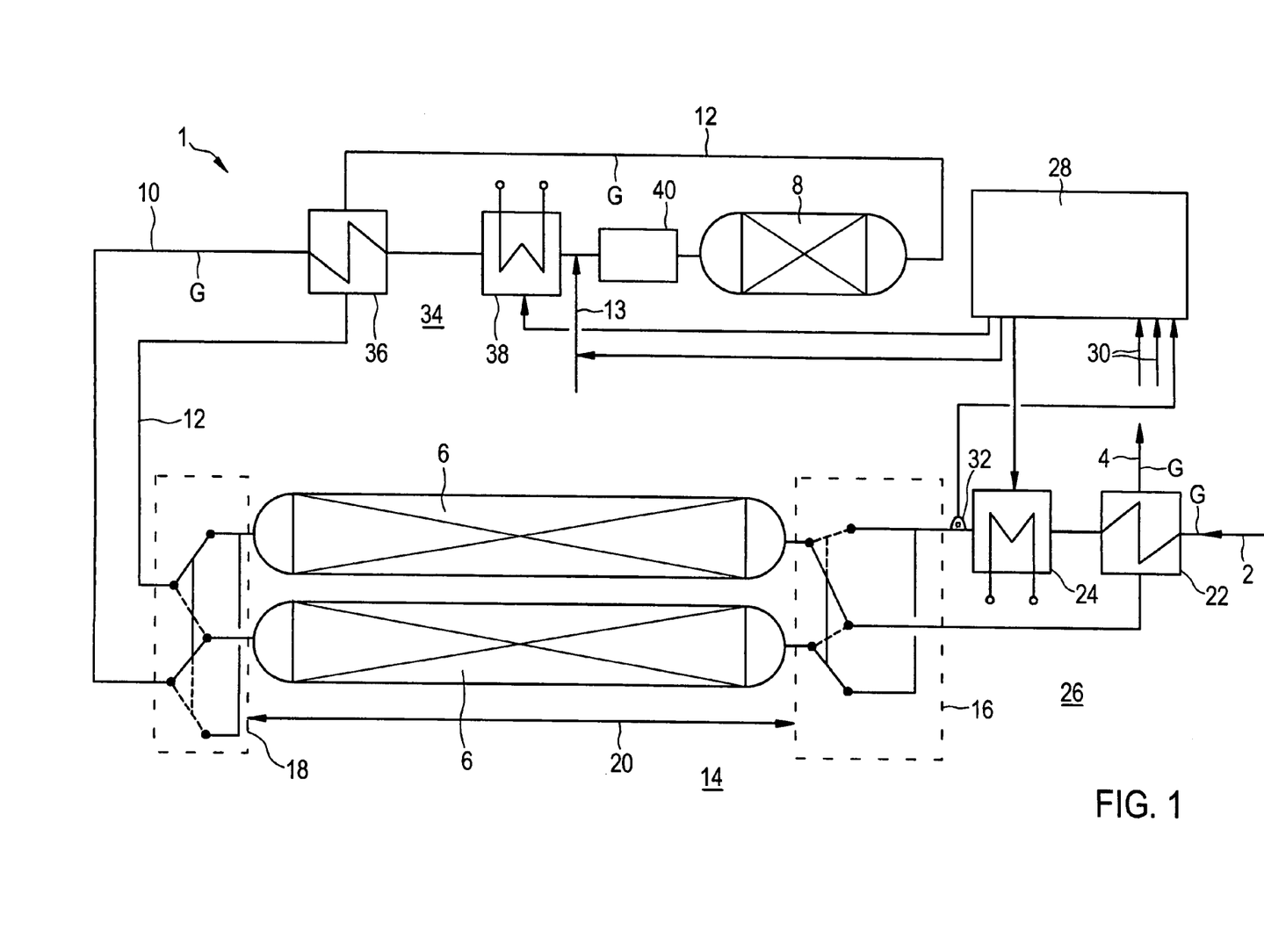
FIG. 1 is a schematic diagram showing a flow diagram of a gas treatment system according to the invention.

The gas treatment system 1 is provided for the targeted removal of impurities, for example hydrogen, carbon monoxide, methane or tritium, which are possibly entrained in the helium of the gas stream G. The removal of hydrogen and carbon monoxide is to be effected by oxidation to water and carbon dioxide, respectively, which are in each case removed and retained in molecular sieves, which are not shown in more detail, installed in the gas discharge line 4.

To convert hydrogen and carbon monoxide into water and carbon dioxide, respectively, the gas purification system contains a number of catalytic adsorber modules 6. A Cu—CuO mixture is present as the catalytic adsorber material in each catalytic adsorber module 6. When using the catalytic adsorber material, its property as a catalyst to aid the desired conversion of hydrogen into water and of carbon monoxide into carbon dioxide is utilized. Second, the ability of the catalytic adsorber material to temporarily store oxygen, which is liberated into the gas stream for the oxidation of hydrogen or carbon monoxide when required, i.e. in the desired reaction, is also utilized. In a catalytic adsorber module 6 operated in this operating mode, i.e. for the oxidation of hydrogen or carbon monoxide, the proportion of CuO in the catalytic adsorber material is decreased while the proportion of Cu is increased.

In addition, the gas treatment system 1 has an oxidation catalyst 8 for the specific conversion of methane or tritium into carbon dioxide and/or water. The gas stream G enters the oxidation catalyst 8, which contains a suitably structured noble metal honeycomb, preferably one containing platinum and/or palladium, as the catalytically active component, via an inflow line 10. On the outlet side, the oxidation catalyst 8 is connected to an outflow line 12 for the gas stream G. To make the desired reaction for removing the impurities methane or tritium in the oxidation catalyst 8 possible, a feed line 13 for oxygen is installed in the inflow line 10 upstream of the oxidation catalyst 8. The illustrative embodiment provides for molecular oxygen to be fed in, but it would also be possible to provide other suitable selected oxygen carriers.

To avoid multiple redundancies and to keep the total number of components required small, the gas treatment system is configured for continuous operation. Continuous operability is provided even for the case when the CuO in the catalytic adsorber module 6 used for the oxidation of the specified impurities in the gas stream G has been completely or virtually completely consumed. To make continued operation of the gas treatment system 1 possible in this case, too, without interruption for a regeneration phase for the catalytic adsorber module 6 being necessary, the gas treatment system 1 has a plurality of, in the illustrative embodiment two, similarly configured catalytic adsorber modules 6. The catalytic adsorber modules 6 are connected in series in the gas flow direction via the inflow line 10 and the outflow line 12, with the oxidation catalyst 8 being located, viewed in the gas flow direction, between the catalytic adsorber modules 6. To connect the catalytic adsorber modules 6 and the oxidation catalyst 8 to one another in terms of gas flow, the catalytic adsorber modules 6 are provided with a joint switching system 14 which includes a first switching unit 16 located at the end of the catalytic adsorber modules 6 and a second switching unit 18 located at the other end of the catalytic adsorber modules 6. The switching units 16, 18 are, as indicated by the double arrow 20, connected in an interactive way so that appropriate synchronous switching of the flow path through the catalytic adsorber module 6 is made possible.

The switching system 14 is configured so that the positioning of the two catalytic adsorber modules 6 in respect of the series arrangement in the gas flow direction of the first catalytic adsorber module 6, the oxidation catalyst 8 and the second catalytic adsorber module 6 can be exchanged. As can be seen for a first switching position in FIG. 1, the catalytic adsorber module 6 shown as lower module in FIG. 1 is connected at the inlet end to the gas feed line 2 and at the outlet end to the oxidation catalyst 8 via the inflow line 10. In contrast, in this switching position, the catalytic adsorber module 6 shown at the top in FIG. 1 is connected at the inlet end to the oxidation catalyst 8 via the outflow line 12 and at the outlet end to the outflow line 4. In the switching position shown in FIG. 1, the lower catalytic adsorber module 6 as the first catalytic adsorber module 6, the oxidation catalyst 8 and the upper catalytic adsorber module 6 as the second catalytic adsorber module 6 are thus disposed in series in the gas flow direction.

After the series connection has been switched over by the switching system 14, an alternative switching position represented in FIG. 1 by the switching elements shown in broken lines in the switching units 16, 18 can be obtained.

In the second switching position, the catalytic adsorber module 6 shown at the top is now connected as the first catalytic adsorber module 6 upstream of the oxidation catalyst 8 by the inflow line 10, while, in the second switching position, the lower catalytic adsorber module 6 is connected as the second catalytic adsorber module 6 downstream of the oxidation catalyst 8 by the outflow line 12.

The catalytic adsorber module 6, which is connected as the first catalytic adsorber module 6 upstream of the oxidation catalyst 8 in the respective switching position serves to oxidize hydrogen or carbon monoxide entrained in the gas stream G. Here, the CuO in the respective catalytic adsorber module 6 gives off oxygen into the gas stream G to make the oxidation possible. To make a reaction temperature in the gas stream G, which is particularly favorable for this reaction possible with comparatively low operating costs and in a resource-conserving manner, a recuperative heat exchanger 22 whose primary or heating side is connected into the offgas line 4 is disposed in the feed line 2. The recuperative heat exchanger 22 thus makes heat transfer from the gas stream G leaving the gas treatment system 1 to the gas stream G flowing into the gas treatment system 1 possible, so that particularly resource-conserving preheating of the inflowing gas stream G is achieved. To make it possible to set particularly favorable operating parameters, in particular an operating temperature of about 250° C., which is particularly favorable for the desired reaction, the recuperative heat exchanger 22 is supplemented by an electrically operated heater 24, which together with the recuperative heat exchanger 22 forms a heating system 26 for the gas treatment system 1. The heating power of the electrically operable heater 24 is controlled via a central control unit 28 which provides suitable control parameters for the electric heater 24 on the basis of a multiplicity of operating parameters determined at suitable positions in the gas stream G, as represented by the arrows 30.

After the hydrogen or carbon monoxide impurities in the gas stream G have been converted in the first, upstream catalytic adsorber module 6, the gas stream G is passed on to the oxidation catalyst 8. There, in the illustrative embodiment, entrained methane or tritium is converted. To make this possible, a suitably selected amount of oxygen is mixed into the gas stream G via the feed line or unit 13. The feed rate for the oxygen is set by the central control unit 28 on the basis of an index determined by a sensor 32 for the proportion of impurities entrained in the gas stream G.

To ensure reliable removal of the specified impurities from the gas stream G in the oxidation catalyst 8, provision is made for the setting of a temperature level, which is particularly suitable for achieving this at the point at which the gas stream G enters the oxidation catalyst 8. For this purpose, an intermediate heating system 34 is installed upstream of the oxidation catalyst 8. The intermediate heating system 34 contains a recuperative heat exchanger 36, which is connected on the primary side into the outflow line 12 and on the secondary side into the inflow line 10. The recuperative heat exchanger 36 thus makes heat transfer from the gas stream G leaving the oxidation catalyst 8 to the gas stream G flowing into the oxidation catalyst 8 possible in a resource-conserving way in the manner of a heat recovery facility. To enable final setting of an entry temperature of the gas stream G of from about 400° C. to 450° C. which is particularly favorable for the reaction in the oxidation catalyst 8, the recuperative heat exchanger 36 is supplemented by an electric heater 38 whose heating power is likewise controlled via the central control unit 28.

To promote the oxidation dreaction of the specified impurities occurring in the oxidation catalyst 8 further, provision is made for particularly intimate mixing of the oxygen fed in via the feed line or unit 13 with the gas stream G before the latter enters the oxidation catalyst 8. For this purpose, a suitable mixer 40, for example a static mixer, is installed upstream of the oxidation catalyst 8.

After the oxidation of the specified impurities by reaction with the oxygen fed in has occurred in the oxidation catalyst 8, the gas stream G flowing out from the oxidation catalyst 8 still contains a small amount of excess oxygen. To remove the excess oxygen, the gas stream G is conveyed via the second, downstream catalytic adsorber module 6 before being discharged. Here, the excess oxygen entrained in the gas stream is incorporated in the catalytic adsorber material present there. In particular, the proportion of CuO in the catalytic adsorber material present in the second, downstream catalytic adsorber module 6 is increased by incorporation of oxygen, with the proportion of Cu in the adsorber material being reduced. As a result of the incorporation of the excess oxygen, the CuO of the catalytic adsorber module 6 is regenerated in normal operation of the gas treatment system 1, so that the catalytic adsorber module 6 is once again available for use as the first, upstream catalytic adsorber module 6 after a sufficient period of operation.

Figure 2:
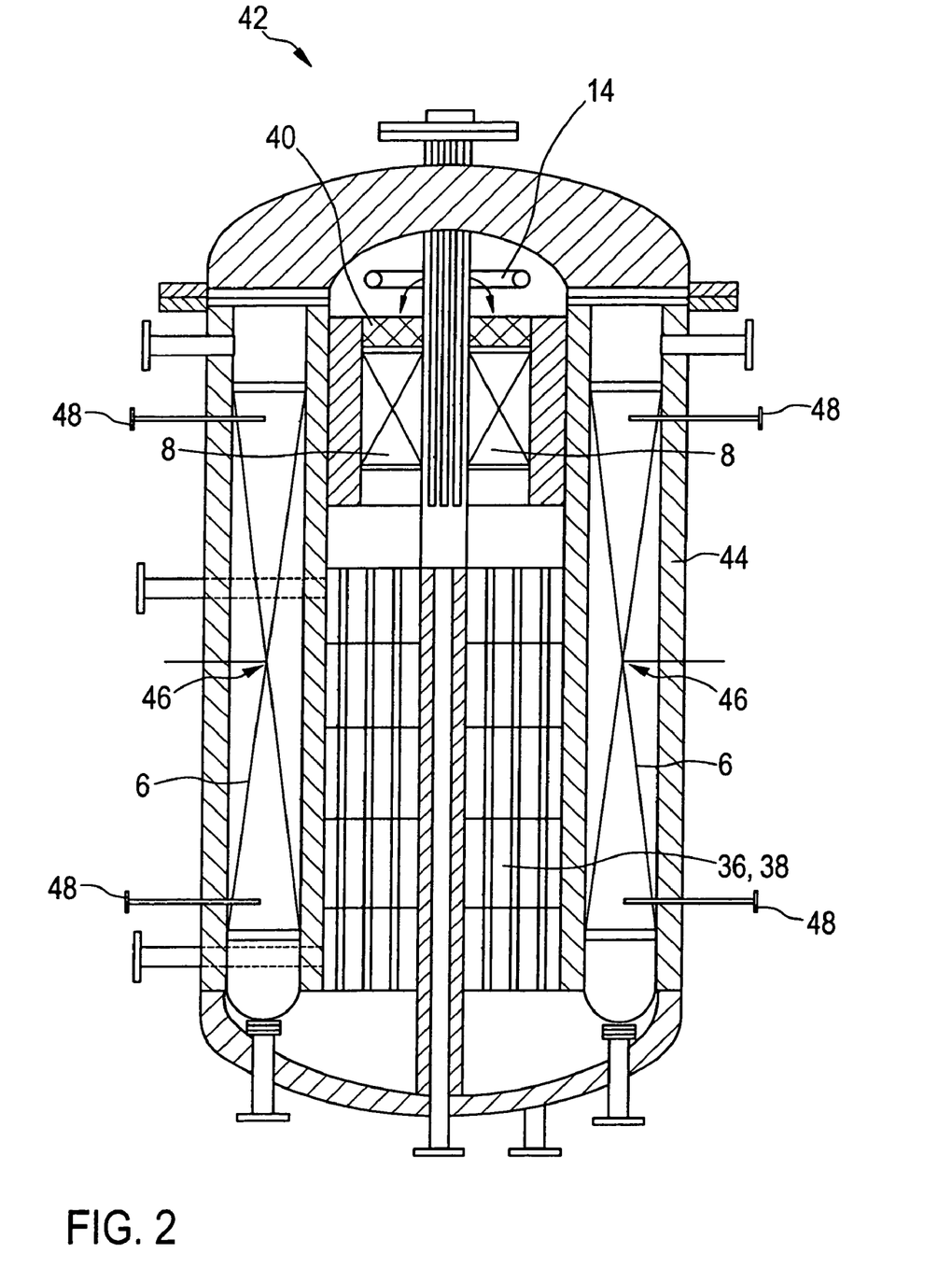
FIG. 2 is a diagrammatic, longitudinal sectional view of the gas treatment system of FIG. 1.
Figure 3:
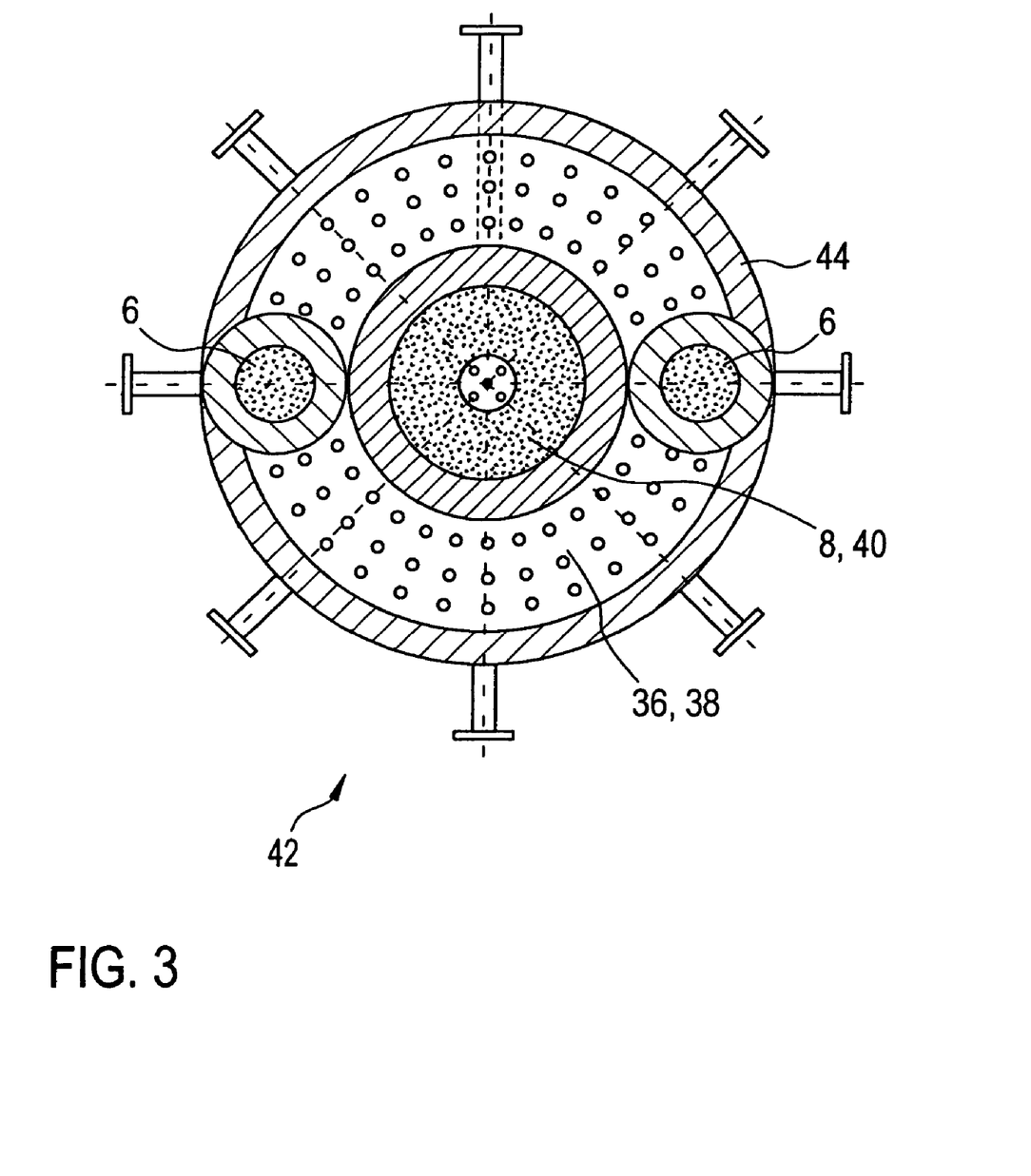
FIG. 3 is a diagrammatic, cross-sectional view of the gas treatment system of FIGS. 1 and 2.

To obtain a particularly compact and thus space-saving and material-saving construction, the significant components of the gas treatment system 1 are integrated into a structural unit 42, which is shown in longitudinal section in FIG. 2 and in cross section in FIG. 3. The structural unit 42 has, in particular, a pressure-rated, essentially cylindrical outer housing 44, which encloses all the components mentioned. The outer housing 44 is configured to withstand the full pressure encountered, so that the components disposed within it can have comparatively thin walls and do not have to be configured to withstand separate mechanical stress. The oxidation catalyst 8 is located in the central region of the outer housing 44, and the mixer 40 is positioned immediately above it. The feed unit 13 for the oxygen is disposed in the manner of an annular injection unit above the mixer 40.

In the illustrative embodiment, the recuperative heat exchanger 36, supplemented by the electric heater 38, is located below the oxidation catalyst 8. The recuperative heat exchanger 36 is advantageously configured as a shell-and-tube heat exchanger. The heating power of the heater 38 can be regulated. The precise configuration of the heating rods in each of these components can of course be varied and chosen according to requirements. The positioning of the recuperative heat exchanger 36 and the oxidation catalyst 8 in the central region of the structural unit 42 ensures that only comparatively small heat losses occur, so that a particularly favorable degree of conversion can be achieved even at only low heating power.

The two catalytic adsorber elements 6 in the illustrative embodiment are located in the outer region within the outer housing 44. With regard to the dimensions of the Cu/CuO reaction beds located therein, a ratio of reaction bed height to reaction bed length of about $L/d \approx 4 \ldots 8$ is adhered to. Compensators, which are not shown in more detail are provided to compensate for thermal expansion. To control the process conditions appropriately, temperature sensors 46 and suitably positioned sampling elements 48 to make analysis of the impurities entrained in the gas stream G possible are disposed in the catalytic adsorber elements 6. The sensors provided for analysis are suitably configured for the analysis of the impurities. In particular, they can be gas chromatographs, mass spectrometers and/or sensors operating according to the principle of heat dissolution or thermal conductivity.

The configuration of the gas treatment system 1 as an integrated unit 42 achieves structural decoupling of the thermally stressed components from the pressure-stressed outer housing 44. The decoupling first allows the outer housing to be constructed using commercially available materials with a low materials consumption and with particularly high operating lives being ensured, and second makes it possible for the thermally stressed components to have comparatively thin walls.

The operation of the gas treatment system 1 is configured, in particular, so that the second catalytic adsorber element 6 located in the downstream position as a function of the respective switching position of the switching system 14 is regenerated for future use by appropriate exposure to excess oxygen. Accordingly, the introduction of the oxygen in the feed unit 13 is set so that there is still sufficient excess oxygen available for incorporation into the respective downstream catalytic adsorber module 6 even after the gas stream G has passed through the oxidation catalyst 8.

The oxygen is, in particular, fed in in such an amount that an excess of oxygen, based on the methane impurity determined in the gas stream G, prevails in the oxidation catalyst 8, so that remaining excess oxygen can be passed onto the downstream catalytic adsorber module 6. However, the amount of oxygen fed in is also set so that there is a deficiency of oxygen based on the total impurities determined in the gas stream G. This ensures that the amount of oxygen released from the catalytic adsorber material of the first, upstream catalytic adsorber module 6 in the oxidation of water or carbon monoxide in the adsorber module is greater than the amount of oxygen which is taken up again in the second, downstream catalytic adsorber module 6. The reduction reaction in the Cu—CuO mixture of the first, upstream catalytic adsorber module 6 therefore proceeds more quickly than the oxidation reaction in the Cu—CuO mixture of the second, downstream catalytic adsorber module 6. Accordingly, should "consumption" of the oxygen in the first, upstream catalytic adsorber module 6 be found, for example in the case of breakthrough of hydrogen or carbon monoxide, an excess of oxygen based on the total impurities determined is set by adjusting the feed rate for the oxygen in the feed unit 13, so that reliable conversion of the remaining impurities in the oxidation catalyst 8 is ensured. As soon as a sufficiently high incorporation of oxygen in the second, downstream catalytic adsorber module 6 is then established, the order in which the catalytic adsorber modules 6 are connected relative to the oxidation catalyst 8 can be switched over in the manner described.

I claim:

1. A process for treating a gas stream, which comprises the steps of:
    passing the gas stream over a first catalytic adsorber module in a first purification stage for oxidation of entrained impurities;
    mixing in molecular or atomic oxygen into the gas stream;
    passing the gas stream with the mixed-in oxygen over an oxidation catalyst in a second purification stage; and
    passing the gas stream leaving the oxidation catalyst over a second catalytic adsorber module in a third purification stage for reducing excess oxygen.

2. The process according to claim 1, which further comprises using a Cu/CuO mixture as a catalytic adsorber material both in the first catalytic adsorber module and in the second catalytic adsorber module.

3. The process according to claim 1, which further comprises determining an index for a proportion of entrained impurities in the gas stream on a basis of which an amount of the oxygen mixed into the gas stream is set, before the gas stream enters the first catalytic adsorber module.

4. The process according to claim 1, which further comprises setting a temperature of the gas stream to from about 400° C. to 450° C. at a point where the gas stream enters the oxidation catalyst.

5. The process according to claim 1, which further comprises preheating the gas stream before the gas stream enters the oxidation catalyst using a recuperative heat exchanger receiving the gas stream leaving the oxidation catalyst.

6. The process according to claim 1, which further comprises setting a temperature of the gas stream to about 250° C. at a point where the gas stream enters the first catalytic adsorber module.

7. The process according to claim 1, which further comprises preheating the gas stream before the gas stream enters the first catalytic adsorber module using a recuperative heat exchanger receiving the gas stream leaving the second catalytic adsorber module.

8. A method of operating a nuclear power station, which comprises the steps of:
    passing a substream of a helium cooling gas stream over a first catalytic acisorber module in a first purification stage for oxidation of entrained impurities;
    mixing in molecular or atomic oxygen into the substream of a helium cooling gas stream;
    passing the gas stream with the mixedin oxygen over an oxidation catalyst in a second purification stage; and
    passing the gas stream leaving the oxidation catalyst over a second catalytic adsorber module in a third purification stage for reducing excess oxygen.

9. The method according to claim 8, which further comprises determining an index for a proportion of possibly entrained oxygen in the gas stream leaving the second catalytic adsorber module and positions of the first and second catalytic adsorber elements in a flow path of the gas stream are exchanged after a prescribed limit for the, index has been exceeded.

10. A gas treatment system, comprising:
    at least tPo catalytic adsorber modules disposed in series relative to a gas stream;
    an oxidation catalyst disposed between said catalytic adsorber modules in a gas flow direction; and a feed unit for feeding molecular or atomic oxygen disposed upstream of said oxidation catalyst.

11. The gas treatment system according to claim 10, further comprising:
   a sensor sensing a proportion of entrained impurities in the gas stream and disposed upstream of a first, one of said catalytic adsorber modules; and
   a controlled parameter transducer assigned to said feed unit and having an input side connected to said sensor.

12. The gas treatment system according to claim 10, wherein said catalytic adsorber.modules each contain a Cu/CuO mixture as a catalytic adsorber material.

13. The gas treatment system according to claim 10, further comprising an intermediate heating system disposed upstream of said oxidation catalyst.

14. The gas treatment system according to claim 13,
   further comprising an outflow line for conducting the gas stream from said oxidation catalyst;
   further comprising an inflow line; and
   wherein said intermediate heating system contains a recuperative heat exchanger having a primary side connected into said outflow line for receiving the gas stream from said oxidation catalyst and a secondary side connected into said inflow line for receiving the gas stream to 1Se sent to said oxidation catalyst.

15. The gas treatment system according to claim 10, further comprising a heating system installed upstream of a first, of said catalytic adsorber modules.

16. The gas treatment system according to claim 15,
   further comprising a gas discharge line connected to a second one of said catalytic adsorber modules;
   further comprising a gas feed system for said first catalytic adsorber module; and
   wherein said heating system has a recuperative heat exchanger having a primary side connected into said gas discharge line for receiving the gas stream from said second catalytic adsorber module and a secondary side connected into said gas feed system for feeding the gas stream to said first catalytic adsorber module.

17. The gas treatment system according to claim 10, further comprising a joint switching system for directing a flow of the gas stream for said catalytic adsorber modules.

18. The gas treatment system according to claim 10, further comprising a pressure vessel functioning as a common outer housing, said catalytic adsorber modules and said oxidation catalyst disposed in said pressure vessel.

19. The gas treatment system according to claim 10, wherein the gas treatment system is connected to a helium cooling gas circuit of a nuclear plant.

* * * * *